March 20, 1973     T. W. SCHAFER     3,721,092

CHUCK

Original Filed Feb. 13, 1970

United States Patent Office 3,721,092
Patented Mar. 20, 1973

3,721,092
CHUCK
Thomas W. Schafer, Chula Vista, Calif., assignor to Rohr Corporation, Chula Vista, Calif.
Original application Feb. 13, 1970, Ser. No. 11,090. Divided and this application Aug. 12, 1971, Ser. No. 171,347
Int. Cl. F15b 7/00; B23b 5/22
U.S. Cl. 60—54.5 H        2 Claims

ABSTRACT OF THE DISCLOSURE

Chuck includes cylindrical housing with central bore and two sets of holes extending from the bore to side surface of housing, said sets being spaced apart axially of the housing and the holes in each set being spaced apart circumferentially thereof. Actuating pistons are disposed in said holes and project from side surface of housing, and a drive piston is disposed in bore between two sets of holes. A collar is mounted on housing for movement axially thereof and has on its inner side cam surfaces which slope relative to side surface of housing and respectively engage projecting ends of actuating pistons in two sets of holes. Fluid disposed in bore between actuating pistons and drive piston cause latter to move axially of bore when collar moves axially of housing and thereby forces one set of actuating piston toward bore while permitting other set of actuating pistons to move away from bore. A collet having jaws therein is attached to housing, and shaft connected to drive piston varies spacing between jaws when drive piston moves in bore.

CROSS-REFERENCE

This application is a division of my copending application for Chuck, Ser. No. 11,090, filed Feb. 13, 1970 now Pat. No. 3,647,231.

SUMMARY OF THE INVENTION

This invention relates to a device for changing rotary motion to linear motion and, more particularly, to a chuck the jaws of which can readily be tightened on a drill or the like without a chuck wrench.

In a preferred embodiment of the invention, a bore extends between the ends of a cylindrical housing and a plurality of holes extend radially from this bore to the side surface of the housing. The bore has a reduced diameter portion at one end thereof and its other end is closed by an end member which is attached to the housing by means of screws and which comprises a threaded hole adapted to receive the end of the spindle of a drill press or the like. The holes which extend from the bore to the side surface of the housing are arranged in two sets spaced apart axially of said housing, the longitudinal axes of the holes in the sets respectively lying in two parallel planes each disposed perpendicular to the longitudinal axis of the housing and the holes in each set being evenly spaced apart circumferentially of said bore. Slidably disposed in the bore between the two sets of holes is a drive piston, and slidably disposed in each of the holes is an actuating piston. A shaft is slidably mounted in the reduced diameter portion of the housing and is connected to the drive piston at one end thereof. The other end of the shaft projects from the end of the housing and is operatively connected to a plurality of wedge-shaped jaws which are mounted in a collet one end of which is threadedly engaged with the housing. The portion of the side surface of the housing which lies between the two sets of holes is formed with a circumferentially extending helical thread, and a collar is disposed around the housing and has on its inner side a threaded portion which engages the thread on said housing. On each side of the threaded portion of the inner side of the collar is a cam surface which diverges from the adjacent side surface of the housing in the direction of the adjacent end of the collar, the aforesaid actuating pistons projecting from the two sets of holes which extend to the side surface of the housing and respectively engaging the two cam surfaces on the collar. Thus when the collar is turned around the housing the cam surfaces on its inner side are moved axially of the housing, and the actuating pistons in one set of the housing holes are forced toward the housing bore by the cam surface engaged therewith while the other cam surface moves away from the side surface of the housing at the portion thereof where the other actuating pistons are located. Hydraulic fluid is disposed in the two cavities between the inner ends of the actuating pistons and the drive piston in the housing bore, so that when one set of actuating pistons moves inwardly the drive piston is forced toward the holes in which the other actuating pistons are positioned. The last mentioned actuating pistons are simultaneously moved away from the housing bore by the hydraulic fluid which is disposed in the space between said pistons and the drive piston. The jaw in the collet, being connected to the drive piston by means of the aforesaid shaft, are also simultaneously moved either toward or away from one another, depending upon the direction of rotation of the collar relative to the housing.

The construction and manner of operation of the preferred embodiment of the invention will be explained in further detail in the following specification wherein reference is made to the accompanying drawings.

DETAILED DESCRIPTION

Figure 2:
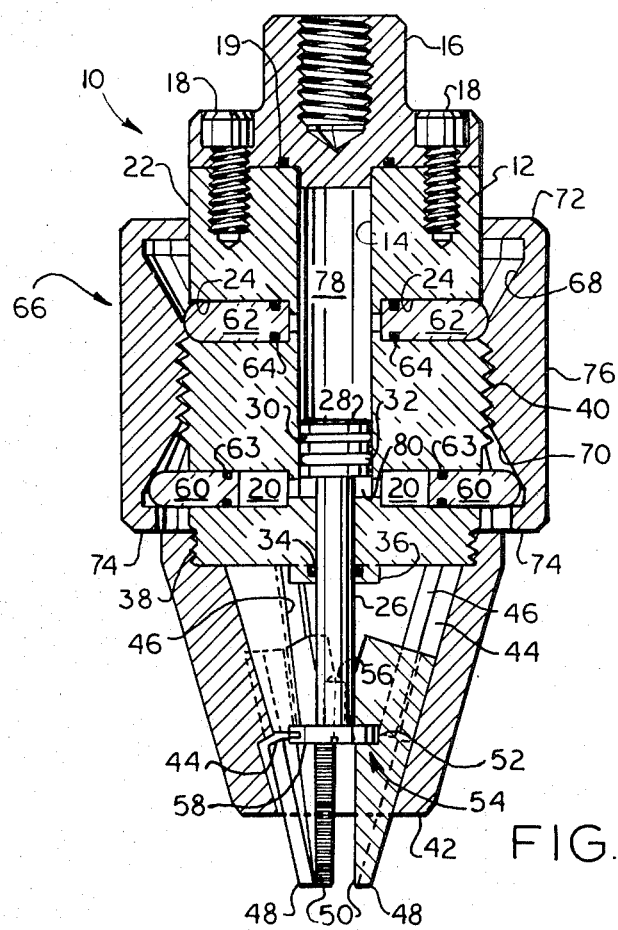
FIG. 2 is a longitudinal sectional view of the same embodiment, taken along the plane represented by line 2—2 in FIG. 1 and in the direction indicated by arrows.
Figure 1:
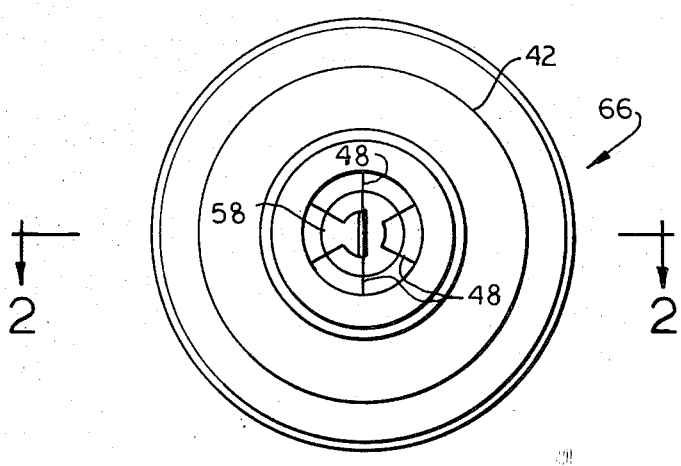
FIG. 1 is an end view of the preferred embodiment of the invention.

In the drawing reference number 10 designates generally a housing which comprises a cylindrical member 12 having a bore 14 extending between the ends thereof, and which also comprises an end cap 16 which is fixedly secured to one end of said member 12 by a plurality of screws 18 and is formed on one side with a cylindrical projection adapted to fit within the adjacent portion of said bore and on the other side with another cylindrical projection having a threaded hole therein. The surface of end cap 16 which abuts the end of member 12 contains an annular groove in which a seal ring 19 is seated. Bore 14 is coaxial with housing 10 and with the threaded hole in the end cap thereof, and it has a reduced diameter at the end of said housing which is lowermost in FIG. 2, which end will be referred to hereinafter as the first end of the housing. Four holes 20 (which are referred to hereinafter as the first holes and only two of which are illustrated) extend from the side surface 22 of housing 10 to the portion of bore 14 next to its reduced diameter portion, the longitudinal axes of said holes being evenly spaced apart circumferentially of said bore and lying in a plane disposed perpendicular to the longitudinal axis thereof. Another set of four holes 24 (which are referred to hereinafter as the second holes and only two of which are illustrated) extend from side surface 22 to bore 14, the longitudinal axes of these holes also being evenly spaced apart ciricumferentially of the bore and lying in a second plane which is disposed perpendicular to the longitudinal axis of the latter and spaced from the plane including the axes of the first holes. Adjacent bore 14 each hole 20, 24 has a reduced diameter.

A cylindrical shaft 26 is slidably mounted in the reduced diameter portion of bore 14 and extends into the larger diameter portion of the bore as illustrated. Integrally formed on the inner end of this shaft is a drive piston 28 having in its side wall two circumferentially extending grooves for seal rings 30, 32. A seal ring 34 is also seated in a groove formed in a projection 36 on the first end of housing 10.

The side surface of housing 10 is formed with two threaded portions 38, 40 which are respectviely disposed at the first end of said housing and between the first and second holes 20, 24. The large diameter end of a tapered collet 42 is provided at its inner wall with threads which engage the threaded first end of housing 10, the collet thus being held in fixed, coaxial relation with the housing and bore 14 therein. Evenly spaced apart circumferentially of the inner wall of collet 42 and extending axially thereof are three slots (only two illustrated) each of which comprises a relatively wide protion 44 and a narrower portion 46, said slots converging toward the longitudinal axis of the collet as the distance from the first end of housing 10 increases and terminating a short distance from the free end of the collet. Wedge-shaped jaws 48 are respectively slidably engaged within the aforesaid slots in collet 42 so that they can move longitudinally thereof, each jaw comprising a portion which conformably fits in the wide portion 44 of the associated slot and an integral portion which conformably fits in the narrow portion 46 of said slot and projects from the latter toward the longitudinal axis of the collet. The inner edges 50 of jaws 48 may be serrated as illustrated to enhance their ability to grip the shanks of drills and the like. Another groove 52 extends transversely across the inner edge of each jaw at the middle portion thereof and toward the wall of the collet, with the side walls of this groove being parallel to each other and perpendicular to the longitudinal axis of said collet. Reference number 54 designates generally a screw the shank 56 of which is threadedly engaged within a hole coaxially formed in the outer end of shaft 26 and the head 58 of which is slidably seated within slots 52 in jaws 48.

Slidably disposed in each first hole 20 and each second hole 24 is an actuating piston 60, 62 which has a seal ring 63, 64 seated in a slot extending circumferentially about its periphery adjacent the inner end thereof. The outer end of each actuating piston is rounded and projects from the side surface 22 of housing 10. The inner side of a collar, designated generally by reference number 66, includes a threaded section which is located equidistant from the ends of said collar and which is engaged with the threaded portion 40 of the side surface of housing 10. On each side of the threaded section of the inner side of the collar is a circumferentially extending cam surface 68, 70 which is inwardly convergent (i.e., each cam surface diverges from the side surface 22 of housing 10 in the direction of the adjacent end of said collar, as illustrated in FIG. 2,) and a circumferentially extending flange 72, 74 projects inwardly from each cam surface at the respective ends of said collar. Preferably the side surface 76 of the collar is knurled.

Two filling holes (not shown) respectively extend through the wall of housing 10 to the space 78 which extends between the inner ends of the actuating pistons 62 in holes 24 to the adjacent end of drive piston 28 and to the space 80 which extends between the inner ends of the actuating pistons 60 in holes 20 to the other end of said drive piston. Suitable means such as set screws (not shown) are removably engaged in the outer end of the filling holes, thus permitting said spaces 78 and 80 to be filled with a suitable hydraulic fluid.

OPERATION

It will be noted in the drawing that the cam surfaces on the inner side of collar 66 are spaced apart at such distance that the outer ends of the actuating pistons 60, 62 in the two sets of holes 20, 24 are respectively engaged therewith. When collar 66 is turned about housing 10 it of course also moves axially thereof. Thus, for example, collar 66 can be moved from its illustrated position in the drawing to a position wherein it is closer to the first end of the housing (i.e., closer to the lower end of the housing in said drawing). Such axial movement of the collar causes cam surface 70 to push the actuating pistons 60 in first holes 20 toward bore 14, while the actuating pistons 62 in second holes 24 are allowed to move away from said bore. As actuating pistons 60 move inwardly drive piston 28 is forced away from the first end of housing 10 by the pressure exerted thereon by the hydraulic fluid in space 80. Since jaws 48 are connected to the drive piston by the shaft 26, they are consequently moved toward the first end of housing 10. Furthermore, since the collect slots in which the jaws are respectively engaged diverge in the direction of housing 10, the spacing between said jaws is simultaneously increased. Obviously if collar 66 is turned in the opposite direction relative to housing 10, jaws 48 are moved away from the latter and toward the longitudinal axis of collet 42. The mechanical advantage provided by cam surface 68 of collar 66 acting against actuating pistons 62 to move them toward bore 14 results in high clamping pressure against a drill or other article disposed between jaws 48.

Various changes in the arrangement of the described and illustrated embodiment of the invention can obviously be made without departing from the concepts of its design and operation. Hence the scope of the disclosed invention should be considered to be limited only by the terms of the claims appended hereto.

What is claimed as new and useful and desired to be secured by U.S. Letters Patent is:

1. In combination:
   a cylindrical housing having a coaxial bore extending from a first end thereof, and first and second holes spaced apart axially of said bore and extending laterally therefrom to the side surface of said housing, said first hole being disposed between said first end of said housing and said second hole;
   a drive piston slidably disposed in said bore between said first and second holes;
   actuating pistons respectively slidably disposed in said first and second holes with one end thereof projecting from the side surface of said housing;
   a shaft extending axially of said bore and sealably engaged with said housing at said first end thereof, one end of said shaft being connected to said drive piston and the other end projecting from said first end of said housing, at least the portion of said shaft between said first hole and said drive piston being spaced from the wall of said bore;

fluid disposed in the first space extending between the actuating piston in said first hole and the adjacent end of said drive piston, and in the second space extending between the actuating piston in said second hole and the adjacent end of said drive piston; and a collar disposed around said housing and mounted thereon for movement axially thereof, a pair of circumferentially extending, inwardly convergent cam surfaces being formed on the inner wall of said collar and spaced apart axially thereof so as to respectively engage said actuating pistons.

2. The combination defined in claim 1 wherein said collar is threadedly engaged with said housing.

References Cited
UNITED STATES PATENTS

| | | | |
|---|---|---|---|
| 2,702,929 | 3/1955 | Laddon et al. | 24—263 H W |
| 2,854,237 | 9/1958 | Richards | 279—4 |
| 2,253,345 | 8/1941 | Palmgren | 279—60 |

ALAN COHAN, Primary Examiner

A. M. ZUPCIC, Assistant Examiner

U.S. Cl. X.R.

60—54.5 R; 279—4, 60